(No Model.) 2 Sheets—Sheet 1.
C. F. ENDTER.
POWER PULLEY.
No. 603,840. Patented May 10, 1898.
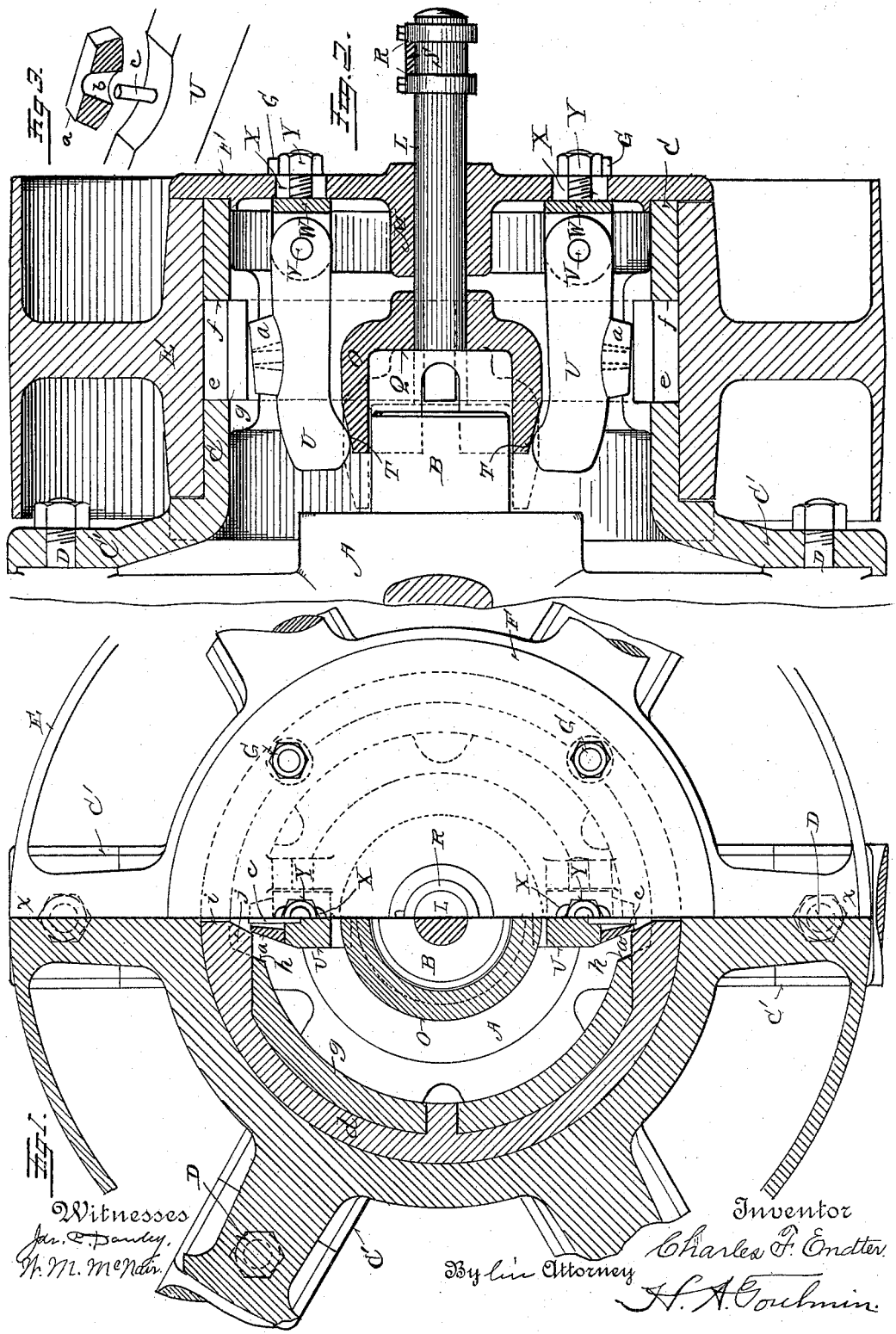
Witnesses
Inventor
Charles F. Endter
By his Attorney (No Model.) 2 Sheets—Sheet 2.
C. F. ENDTER.
POWER PULLEY.
No. 603,840. Patented May 10, 1898.
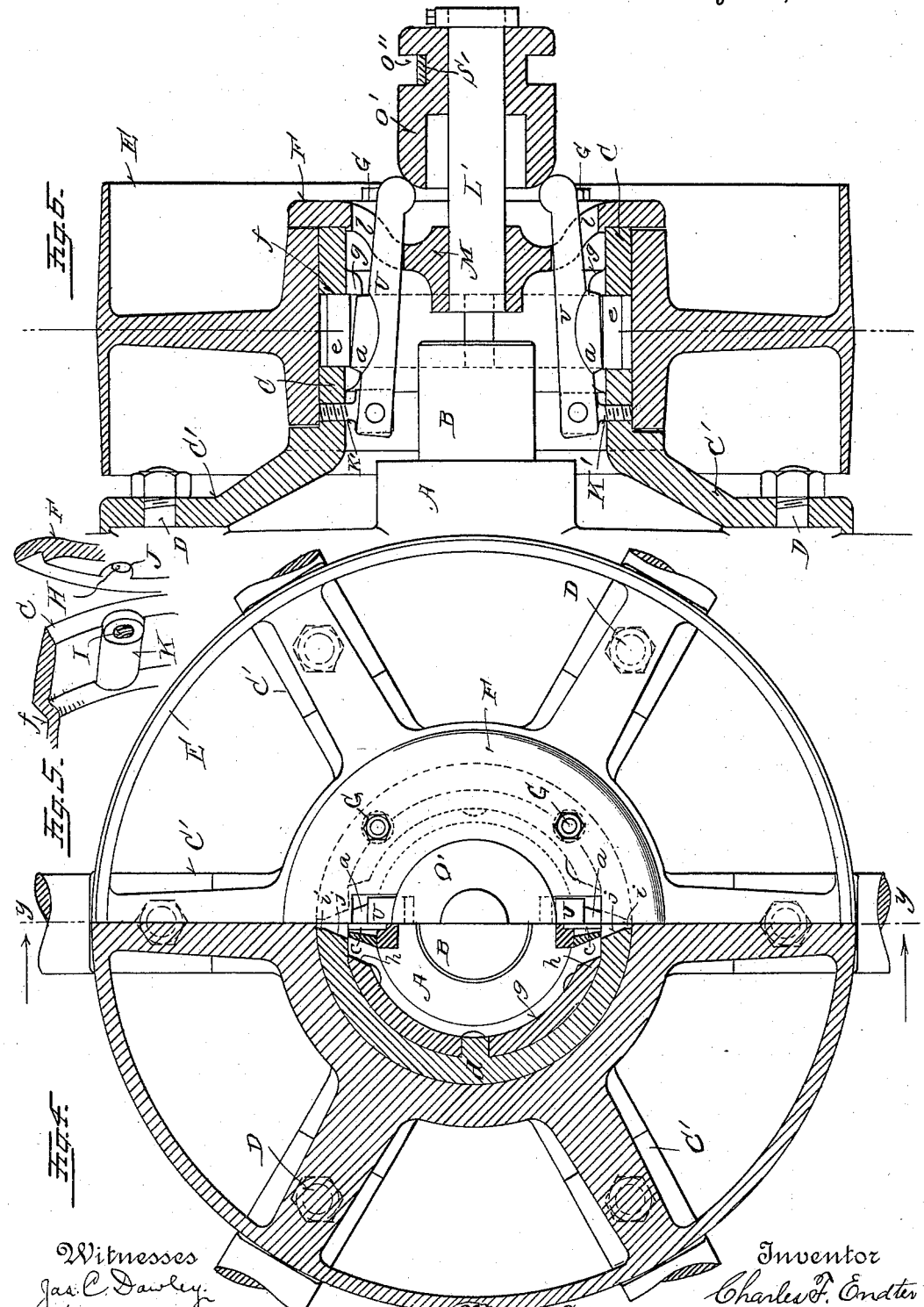
Witnesses
Jas. C. Dawley.
H. M. McNair.
Inventor
Charles F. Endter
By his Attorney
H. A. Toulmin.

UNITED STATES PATENT OFFICE.

CHARLES F. ENDTER, OF SPRINGFIELD, OHIO.

POWER-PULLEY.

SPECIFICATION forming part of Letters Patent No. 603,840, dated May 10, 1898.

Application filed September 11, 1897. Serial No. 651,328. (No model.)

*To all whom it may concern:*

Be it known that I, CHARLES F. ENDTER, a citizen of the United States, residing at Springfield, in the county of Clark and State of Ohio, have invented certain new and useful Improvements in Power-Pulleys, of which the following is a specification, reference being had therein to the accompanying drawings.

This invention relates to certain new and useful improvements in power-pulleys; and the essential feature of my invention is a hollow bearing adapted to be secured to a flywheel or other rotating body and extended beyond said body to one side thereof and having loosely mounted on it a power-pulley, a clutch mechanism within said hollow bearing essentially supported by said hollow bearing adapted to clutch and unclutch the pulley from the bearing, so that the pulley will be alternately fast and loose.

My invention also comprehends numerous features of detail, arrangement, and construction, which will be hereinafter fully pointed out and described, and particularly pointed out in the claims.

In the accompanying drawings, on which like reference-letters indicate corresponding parts, Figure 1 is a partial side elevation and sectional view of my improved pulley; Fig. 2, an axial section of the same on the line $x\ x$ of Fig. 1; Fig. 3, a detail perspective view of the part of one of the clutch-dogs and its contact-block; Fig. 4, a similar view to Fig. 1, showing a modification; Fig. 5, a detail perspective view of a part of the bearing and its head, and Fig. 6 another axial sectional view on the line $y\ y$ of Fig. 4.

The letter A designates so much as I deem necessary to show of a fly or balance wheel, which may be in the form of a spoked wheel or of a disk or plate, it being the rotatable body to which I secure the pulley. In the present exemplification of my invention this wheel is assumed to be the fly-wheel of a gas-engine mounted on the main shaft B. It is the usual and common thing in using clutches to grip power-pulleys to extend the shaft through the pulley and to mount the clutch upon the shaft. In gas-engines particularly this is objectionable, as it requires the shaft to be much longer than is consistent with the compactness desirable in such engines, to say nothing of the expense of extending these shafts some seventeen to twenty-four inches beyond the wheel, as is usual. With my invention I avoid the shaft extension.

The letter C designates a hollow bearing in the nature of a short cylinder having spider-arms or suitable projections C', adapted to be secured to the rotatable body, as to the spokes of the wheel A, by bolts D. On the outside of this hollow bearing I mount a power-pulley E of any suitable style and form. This pulley is to carry the belt that transmits the power, say, from the gas-engine to the machinery that is to be driven. This pulley I alternately clutch to and unclutch from the hollow bearing, so that the bearing may rotate the pulley or run loosely in it and allow it to remain idle. I have shown two forms of such clutch mechanism, one in Figs. 1 and 2 and the other in Figs. 4 and 6. I will first describe the former, first stating that in either case there is a head or cap F, secured to the hollow bearing C in any desired manner, as by bolts G, applied in openings H in the head and openings I in the bearing, which openings are more clearly shown in Fig. 5. These parts are enlarged in the form of bosses J and K, respectively, to provide for forming these openings. In each form also there is a clutch-shaft mounted in a bearing M in this head or cap. In the form shown in Figs. 1 and 2 this shaft L has a clutch-head O on its inner end, cupped out, as shown at Q, to freely extend over the projecting end of the shaft B. The other end of the shaft has collars R, between which is placed a lever S, whose function is to shift the shaft longitudinally, so as to bring the incline or cam surfaces T of the clutch-head under or to remove it from the clutch-dogs U, pivoted on studs V, carried by brackets W, adjustably mounted in the head or cap F by having their shank extended through slots X and provided with nuts Y. I preferably employ two of these pivoted clutch-dogs, and each is provided with a shiftable contact-block $a$, having a tapering hole $b$, adapted to fit over a pin $c$, carried by the dogs and arranged to shift on the pins and dogs, so that they will make parallel contact with the clutch-rings, presently to be described, irrespective of the position of the studs V due to their radial adjustment by shifting the brackets W in the slots X.

I will now refer to the clutch-ring. It is a two-part ring and is shown at $d$ $e$ and is placed in a groove $f$, formed in the outside of the hollow bearing by constructing the latter with an inner annular web $g$. This web is slotted, as seen at $h$, to permit the contact-block of the dogs to pass through the web in between the meeting ends $i$ of the ring-sections, which ends are beveled, as shown at $j$, to facilitate the entrance of the contact-block. Thus when these blocks are forced outward against the ends of the ring-sections the latter are thrust radially and made to bind or impinge firmly or strongly against the inside of the pulley-hub. This frictionally secures the pulley to the rotating hollow bearing, which, through the connections shown and described, carries this clutch mechanism.

I will now refer to the clutch mechanism in the modified form shown in Figs. 4 and 6. In this form the clutch-shaft L' is stationary in the hub or bearing M and the clutch-dogs U are pivoted at their inner ends to the heads or screws K', which are screwed into the hollow bearing C, and the clutched head O is slidable on the outer end of the shaft L' and is grooved, as shown at O'', to receive the shifting lever S'. The radial adjustment of the pivots of the dogs is accomplished by screwing the screws $k'$ more or less into the bearing. The head M is slotted, as shown at $l$, for the passage of the dog. The remaining features are the same as in the other form.

Thus it will be seen that in my improved pulley I have a rotatable hollow bearing which is carried by the fly-wheel or other revolving body, and that this pulley is normally loose on such bearing, but can be frictionally engaged therewith, so as to be driven by the bearing.

Having thus fully described my invention, what I claim as new, and desire to secure by Letters Patent, is—

1. In a power-pulley, the combination with a rotatable body and a hollow bearing secured thereto and extended beyond said body to one side thereof, of a pulley loosely mounted upon such bearing, and a clutch mechanism within said hollow bearing to alternately clutch and unclutch the pulley to and from the bearing.

2. In a power-pulley, the combination with a rotatable body and a hollow bearing secured thereto and extended beyond said body to one side of it, of a pulley loosely mounted upon such bearing and clutch mechanism mounted within and supported by said bearing and adapted to clutch and unclutch the pulley to and from said bearing.

3. In a power-pulley, the combination with a rotatable body and a hollow bearing secured thereto and extended beyond said body to one side of it, of a pulley loosely mounted upon such bearing, a cap secured to the bearing, pivoted dogs supported by the bearing, a clutch-shaft mounted in the cap and having a clutch-head adapted to engage with such dogs, and a friction-ring between the bearing and pulley and adapted to be operated by said dogs.

4. In a power-pulley, the combination with a rotatable body and a hollow bearing secured to it and extending to one side of it, said bearing having an annular groove and an interior slotted web, of a pulley loosely mounted on said bearing, a divided friction-ring in said groove and next to said pulley, a cap secured to said bearing, a clutch-shaft mounted in said cap and having a clutch-head, and pivoted dogs supported by said bearing and having contact-blocks adapted to enter the slots in the web and engage with the ends of the divided ring for the purpose described.

5. In a power-pulley, the combination with a rotatable body and a hollow bearing secured to it and extending to one side and having an annular groove and slotted web, a cap secured to said bearing, pivoted dogs adjustably secured to said cap and having contact-blocks adapted to pass through the slots in the web, a divided ring in said annular groove adapted to be engaged by said contact-blocks and a clutch-shaft having a clutch-head and mounted in said cap.

6. In a power-pulley, the combination with a hollow bearing, and a pulley loosely mounted upon it, and a cap secured to said bearing, of clutch mechanism carried by the bearing and cap and adapted to clutch and unclutch the pulley to and from the bearing.

In testimony whereof I affix my signature in presence of two witnesses.

CHARLES F. ENDTER.

Witnesses:
 OLIVER H. MILLER,
 W. M. MCNAIR.